United States Patent
Breen et al.

(10) Patent No.: US 7,583,055 B2
(45) Date of Patent: Sep. 1, 2009

(54) INFORMATION HANDLING SYSTEM CAPABLE OF OPERATING WITH A POWER ADAPTER HAVING A POWER RATING LOWER THAN THE INFORMATION HANDLING SYSTEM'S POWER RATING

(75) Inventors: John J. Breen, Harker Heights, TX (US); Mohammed K. Hijazi, Austin, TX (US); Jay L. Taylor, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 688 days.

(21) Appl. No.: 10/965,392

(22) Filed: Oct. 14, 2004

(65) Prior Publication Data

US 2006/0082960 A1 Apr. 20, 2006

(51) Int. Cl.
*H02J 7/00* (2006.01)
*H05K 7/00* (2006.01)

(52) U.S. Cl. .................. 320/107; 320/134; 361/783; 710/301; 710/303

(58) Field of Classification Search ............... 320/107, 320/134; 361/783; 710/303, 301; 307/125, 307/150, 64
See application file for complete search history.

(56) References Cited

U.S. PATENT DOCUMENTS

| | | | | |
|---|---|---|---|---|
| 5,886,424 A | * | 3/1999 | Kim | 307/64 |
| 6,218,810 B1 | * | 4/2001 | Matsumoto | 320/134 |
| 6,424,123 B1 | * | 7/2002 | Odaohhara et al. | 320/134 |

* cited by examiner

*Primary Examiner*—Adolf Berhane
*Assistant Examiner*—Yalkew Fantu
(74) *Attorney, Agent, or Firm*—Haynes and Boone, LLP

(57) ABSTRACT

In response to detecting that a power adapter, having a first power rating lower than a second power rating of an information handling system ("IHS"), is coupled to the IHS and in response to a request indicating that the IHS is to be powered on, the power adapter is decoupled from the IHS so that the IHS receives power from a battery included by the IHS.

22 Claims, 3 Drawing Sheets

100

INFORMATION HANDLING SYSTEM CAPABLE OF OPERATING WITH A POWER ADAPTER HAVING A POWER RATING LOWER THAN THE INFORMATION HANDLING SYSTEM'S POWER RATING

BACKGROUND

The description herein relates to information handling systems capable of operating with power adapters.

As the value and use of information continue to increase, individuals and businesses seek additional ways to process and store information. One option available to users is information handling systems. An information handling system ("IHS") generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An IHS typically has a power requirement (e.g., as indicated by the IHS' power rating). With a portable IHS (e.g., a notebook computer), power is sometimes supplied via a power adapter. Accordingly, an IHS and its associated power adapter are designed so that the power adapter's power rating is appropriate for the IHS (e.g., IHS' power rating and the power adapter's power rating are substantially identical).

However, in some situations, a power adapter with an appropriate power rating may not be available for an IHS (e.g., because the IHS' user has misplaced the power adapter). Also, in such situations, a power adapter with a power rating that is lower than the IHS' power rating may instead be available. With a current technique, the IHS is not operable while coupled to the power adapter with a power rating that is lower than the IHS' power rating.

What is needed is a method and system without the disadvantages discussed above.

SUMMARY

In response to detecting that a power adapter, having a first power rating lower than a second power rating of an information handling system ("IHS"), is coupled to the IHS and in response to a request indicating that the IHS is to be powered on, the power adapter is decoupled from the IHS so that the IHS receives power from a battery included by the IHS.

DETAILED DESCRIPTION

For purposes of this disclosure, an information handling system ("IHS") includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
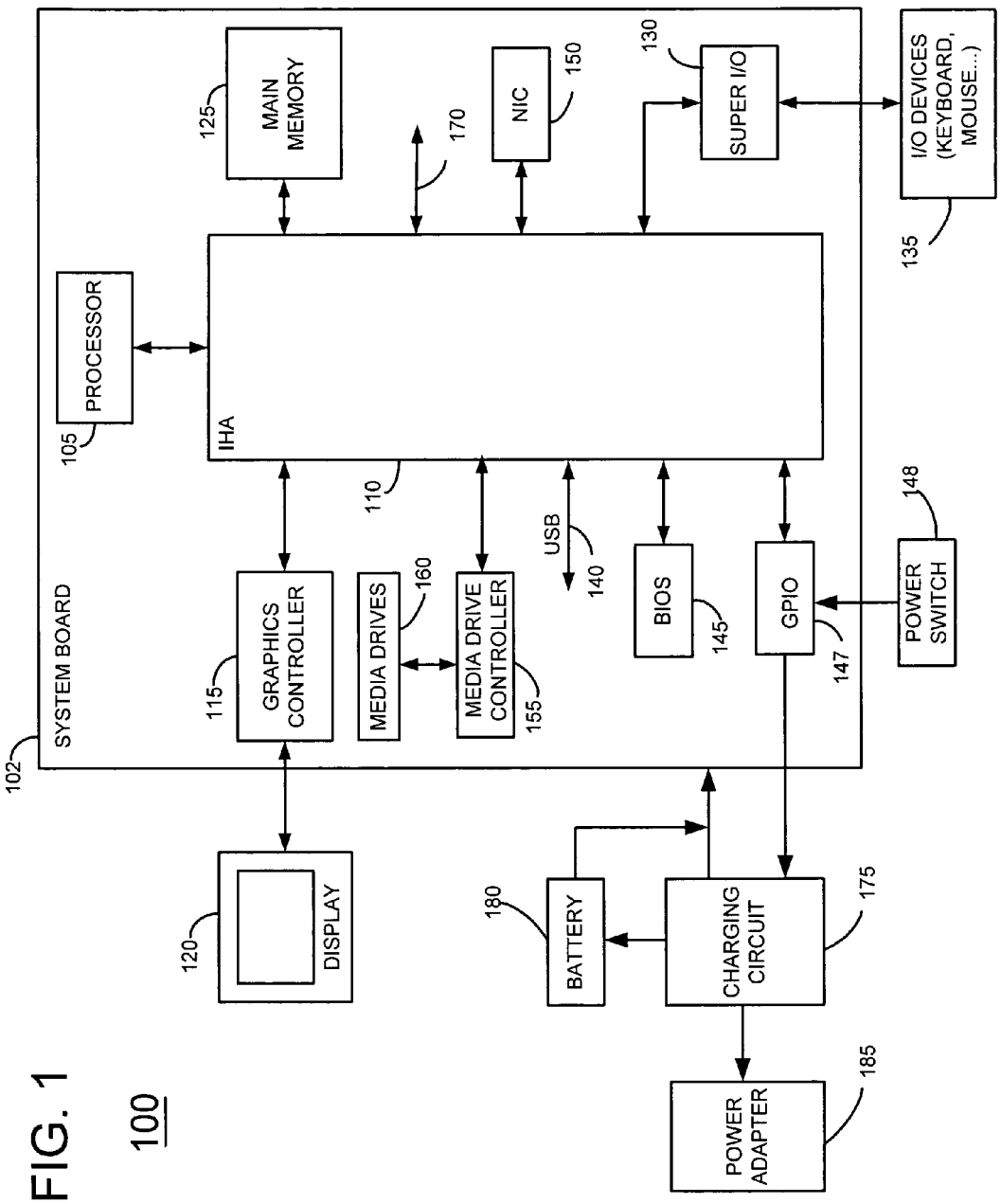
FIG. 1 is a block diagram of an information handling system, according to the illustrative embodiment.

FIG. 1 is a block diagram of an information handling system ("IHS"), according to the illustrative embodiment. The IHS 100 includes a system board 102. The system board 102 includes a processor 105 such as an Intel Pentium series processor or one of many other processors currently available. An Intel Hub Architecture (IHA) chipset 110 provides the IHS system 100 with graphics/memory controller hub functions and I/O functions. More specifically, the IHA chipset 110 acts as a host controller which communicates with a graphics controller 115 coupled thereto. A display 120 is coupled to the graphics controller 115. The chipset 110 further acts as a controller for main memory 125 which is coupled thereto. The chipset 110 also acts as an I/O controller hub (ICH) which performs I/O functions. A super input/output (I/O) controller 130 is coupled to the chipset 110 to provide communications between the chipset 110 and input devices 135 such as a mouse, keyboard, and tablet, for example. A universal serial bus (USB) 140 is coupled to the chipset 110 to facilitate the connection of peripheral devices to system 100. System basic input-output system (BIOS) 145 is coupled to the chipset 110 as shown. The BIOS 145 is stored in CMOS or FLASH memory so that it is nonvolatile.

A local area network (LAN) controller 150, alternatively called a network interface controller (NIC), is coupled to the chipset 110 to facilitate connection of the system 100 to other IHSs. Media drive controller 155 is coupled to the chipset 110 so that devices such as media drives 160 can be connected to the chipset 110 and the processor 105. Devices that can be coupled to the media drive controller 155 include CD-ROM drives, DVD drives, hard disk drives and other fixed or removable media drives. An expansion bus 170, such as a peripheral component interconnect (PCI) bus, PCI express bus, serial advanced technology attachment (SATA) bus or other bus is coupled to the chipset 110 as shown. The expansion bus 170 includes one or more expansion slots (not shown) for receiving expansion cards which provide the IHS 100 with additional functionality.

The IHS 100 also includes a general purpose input/output ("GPIO") controller 147 which is coupled to the IHA 110.

The GPIO controller 147 is also coupled to a charging circuit 175. The charging circuit 175 is coupled to a power adapter 185 and a battery 180.

Figure 2:
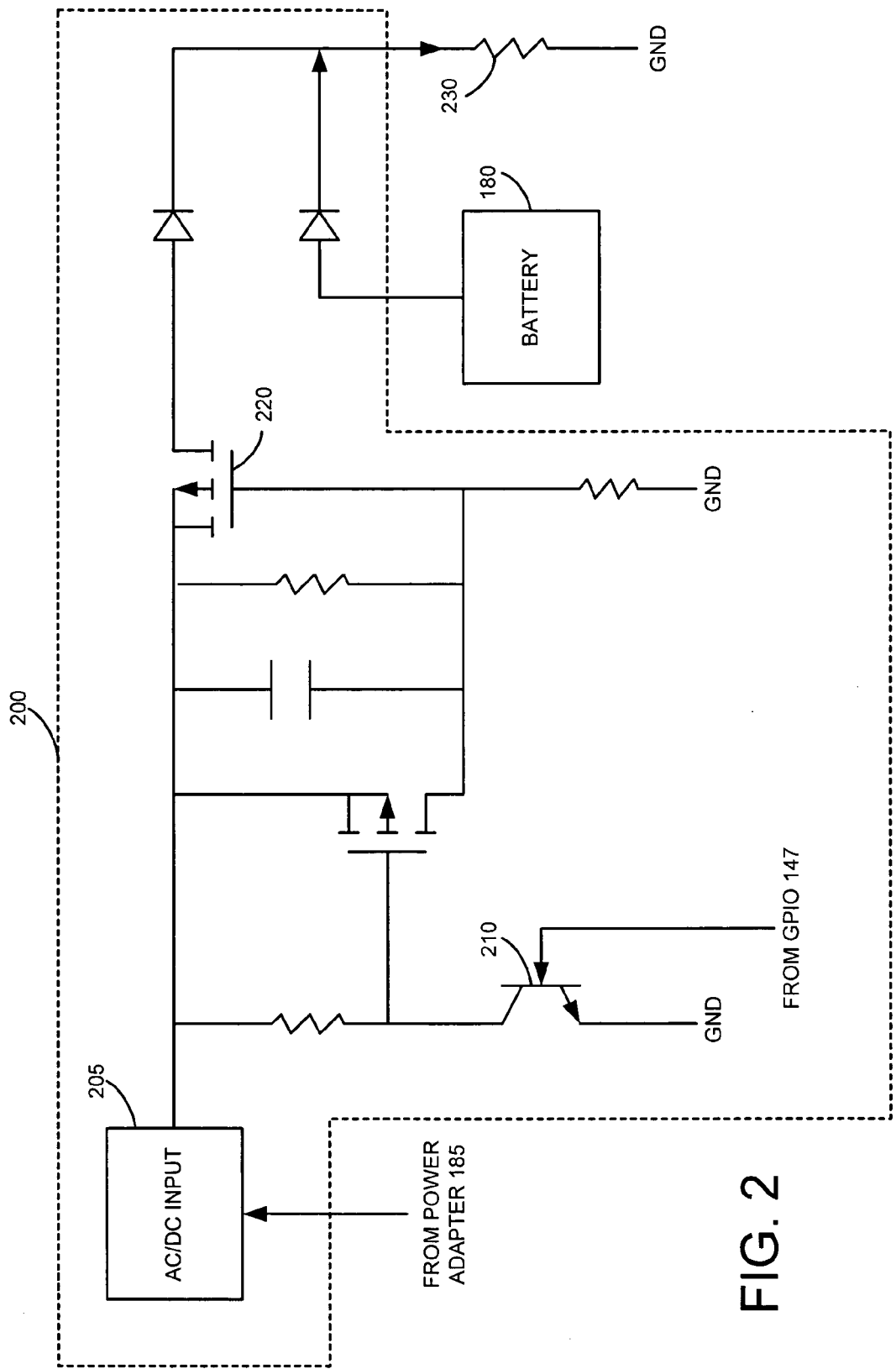
FIG. 2 is a block diagram of a charging circuit included by the information handling system of FIG. 1, according to the illustrative embodiment.

FIG. 2 is a more detailed block diagram of a charging circuit, indicated generally at 200, that is representative of the charging circuit 175 of FIG. 1, according to the illustrative embodiment. The charging circuit 200 includes an alternating current/direct current ("AC/DC") input 205. The AC/DC input 205 is coupled to the power adapter 185 of FIG. 1 so that the charging circuit 200 is capable of receiving power via the power adapter 185. The charging circuit 200 also includes a switch 210, which is coupled to the GPIO controller 147 of FIG. 1. Moreover, the charging circuit 200 includes a switch 220, which is coupled to the switch 210, and the AC/DC input 205. In one example, one or more of the switches 210 and 220 are field effect transistors ("FET"), such as a P channel metal-oxide semiconductor FET ("MOSFET").

As discussed above, the IHS 100 receives power (e.g., power supplied from a wall outlet) via the power adapter 185. The charging circuit 200 receives such power from the power adapter 185, and outputs to the IHS 100. Accordingly, a system load 230 of FIG. 2 depicts a system load that the IHS 100 exerts on the charging circuit 200.

Also as discussed above, in some situations, a power adapter with an appropriate power rating (e.g., a power rating that is substantially identical to a power rating of a IHS with which the power adapter is associated) may not be available for an IHS. In this example, the power adapter 185 has a power rating that is lower than the IHS 100's power rating. With a conventional technique, the IHS 100 is not capable of operating while coupled to the power adapter 185 to receive power. Accordingly, the IHS 100 performs the operations discussed below (in connection with FIG. 3) so that the IHS 100 is capable of operating while coupled to the power adapter 185.

Figure 3:
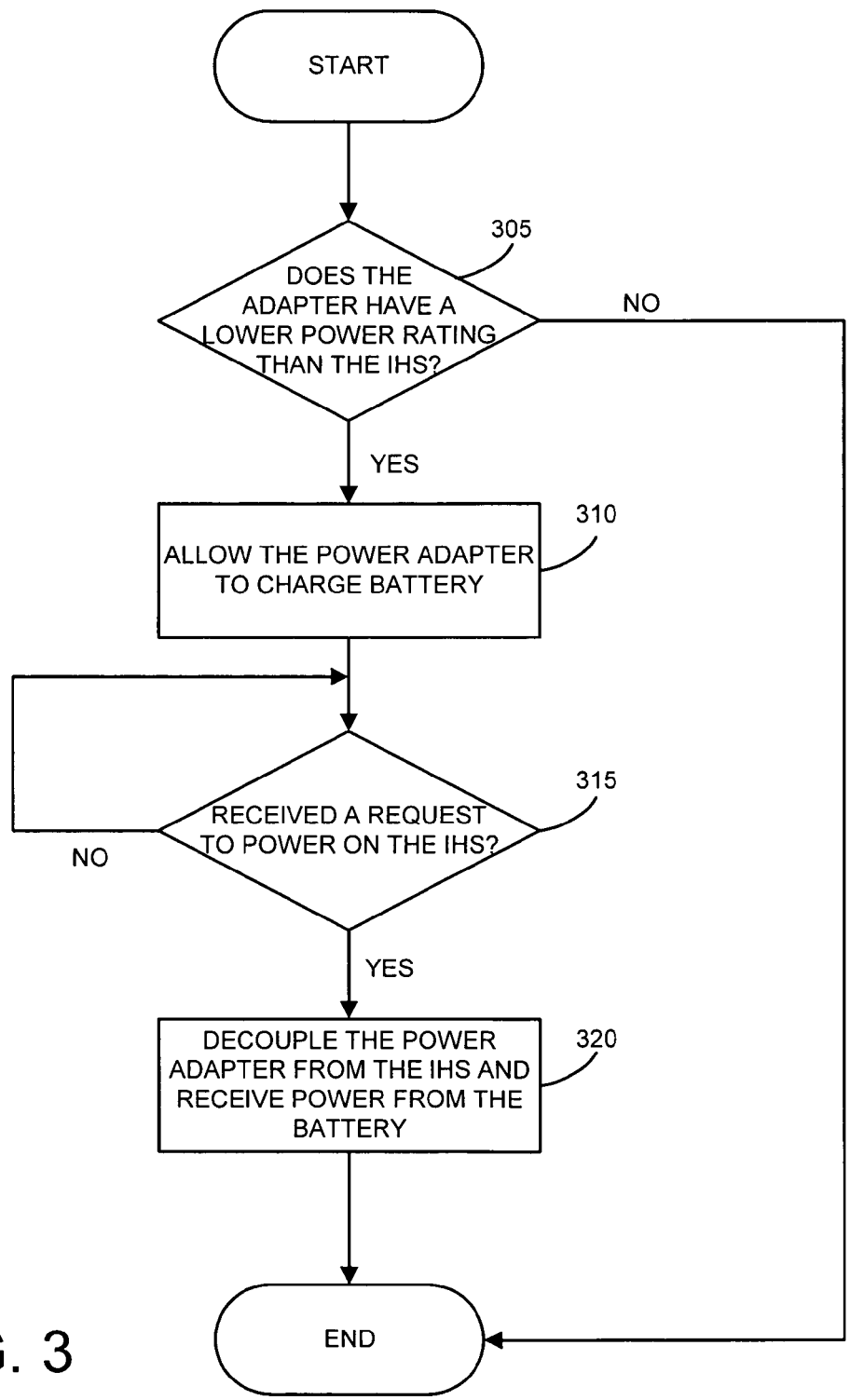
FIG. 3 is a flow chart illustrating the operations performed by the information handling system of FIG. 1.

FIG. 3 is a flow chart illustrating the operations performed by the IHS 100 of FIG. 1. The operation begins at a step 305, where the IHS 100 determines whether a power adapter (e.g., the power adapter 185 of FIG. 1) that is coupled to the IHS 100 has a power rating that is lower than the power rating of the IHS 100. If the IHS 100 determines that the power rating of the power adapter 185 is not lower than the power rating of the IHS 100, the IHS 100 also determines that the power adapter 185's power rating is appropriate for the IHS 100. Accordingly, in such situation, the operation ends as shown in FIG. 3. Conversely, if the IHS 100 determines that the power rating of the power adapter 185 is lower than the power rating of the IHS 100 as is the case with the power adapter 185 and the IHS 100, the operation continues to a step 310.

At the step 310, the IHS 100 allows the power adapter 185 that is coupled to the IHS 100 to charge the battery 180. Notably, although the power adapter 185's power rating is not suitably high to supply power to the IHS 100 (e.g., so that IHS 100 is capable of being powered on with power from the power adapter 185), the power adapter 185 is nonetheless capable of supplying power to charge the battery 180. After the step 310, the operation continues to a step 315.

At the step 315, the IHS 100 self loops until it has determined that it has received a request (e.g., a signal) to power on the IHS 100. In one example, such request is received in response to a user activating (e.g., by "pressing") the power switch 148 of FIG. 1. In response to the IHS 100 determining that it has received a request to power on the IHS 100, the operation continues to a step 320.

At the step 320, the IHS 100 decouples the power adapter 185 from the IHS 100 (e.g., the system load 230). In the illustrative embodiment, the power switch 148 is coupled to the GPIO controller 147 as shown in FIG. 1. In one version of the illustrative embodiment, in response to a user activating the power switch 148, the GPIO controller 147 causes the switch 210 to be closed (e.g., the GPIO controller 147 drives the switch 210 "high"). In response to the GPIO controller 147 driving the switch 210 high, the switch 220 becomes open (e.g., closing of the switch 210 drives the switch 220 "low"). Accordingly, the charging circuit 200 isolates the power adapter 185 from the system load 230 so that a user activating the power switch 148 does not cause the power adapter 185 to be "latched" off.

Also, after the charging circuit 200 isolates the power adapter 185 from the system load 230, the system load 230 is still coupled to the battery 180. Accordingly, at the step 320, the IHS 100 receives power from the battery 180, which is capable of being charged by a power adapter (e.g., the power adapter 185) having a power rating lower than the IHS 100's power rating, as shown in the step 310. In such manner, the IHS 100 is capable of being powered on by receiving power from the battery 180.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A method comprising:
   providing an information handling system (IHS);
   providing a power adapter operable to couple with the IHS, thereby providing electrical power to the IHS;
   detecting that the power adapter, has a first power rating lower than a second power rating of the IHS, when the power adapter is coupled to the IHS; and
   in response to a request indicating that the IHS is to be powered on, decoupling the power adapter from the IHS so that the IHS receives power from a battery included by the IHS.

2. The method of claim 1, and comprising:
   before receiving the request, charging the battery with power from the power adapter.

3. The method of claim 1, wherein the decoupling includes:
   opening a switch located between the power adapter and the IHS.

4. The method of claim 3, wherein the opening is performed by an input/output ("I/O") controller.

5. The method of claim 4, wherein the I/O controller is a general purpose input/output ("GPIO") controller.

6. The method of claim 4, wherein the switch is a field effect transistor ("FET").

7. The method of claim 6, wherein the FET is a P junction metal-oxide FET ("MOSFET").

8. The method of claim 1, wherein the request is generated in response to a user activating a power switch included by the IHS.

9. A method comprising:
   coupling a power adapter, having a first power rating lower than a second power rating of an information handling system ("IHS"), to the IHS;
   charging a battery, included by the IHS, with power from the power adapter;
   in response to a request to power on the IHS, decoupling the power adapter from the IHS; and
   powering on the IHS with power from the battery.

10. The method of claim 9, wherein the decoupling includes:
opening a switch located between the power adapter and the IHS.

11. The method of claim 10, wherein the opening is performed by an input/output ("I/O") controller.

12. The method of claim 11, wherein the I/O controller is a general purpose input/output ("GPIO") controller.

13. The method of claim 10, wherein the switch is a field effect transistor ("FET").

14. The method of claim 13, wherein the FET is a P junction metal-oxide FET ("MOSFET").

15. An information handling system ("IHS") comprising:
a processor;
a battery; and
a charging circuit, coupled to the battery, for:
in response to detecting that a power adapter, having a first power rating lower than a second power rating of the IHS, is coupled to the IHS and in response to a request indicating that the IHS is to be powered on, decoupling the power adapter from the IHS so that the IHS receives power from the battery.

16. The IHS of claim 15, wherein the charging circuit is for:
before receiving the request, charging the battery with power from the power adapter.

17. The IHS of claim 15, wherein the charging circuit includes a switch located between the power adapter and the IHS and the decoupling includes opening the switch.

18. The IHS of claim 17, wherein the opening is performed by an input/output ("I/O") controller.

19. The IHS of claim 18, wherein the I/O controller is a general purpose input/output ("GPIO") controller.

20. The IHS of claim 17, wherein the switch is a field effect transistor ("FET").

21. The IHS of claim 20, wherein the FET is a P junction metal-oxide FET ("MOSFET").

22. The IHS of claim 15, and comprising a power switch, wherein the request is generated in response to a user activating the power switch.

* * * * *

UNITED STATES PATENT AND TRADEMARK OFFICE
CERTIFICATE OF CORRECTION

PATENT NO. : 7,583,055 B2  Page 1 of 1
APPLICATION NO. : 10/965392
DATED : September 1, 2009
INVENTOR(S) : Breen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Fourteenth Day of September, 2010

David J. Kappos
*Director of the United States Patent and Trademark Office*